US011992031B2

(12) United States Patent
Garzino et al.

(10) Patent No.: US 11,992,031 B2
(45) Date of Patent: May 28, 2024

(54) PET FOOD COMPOSITIONS FOR WEIGHT MANAGEMENT IN PETS WITH ADVERSE FOOD REACTION

(71) Applicant: MARS, INCORPORATED, McLean, VA (US)

(72) Inventors: Benedicte Garzino, Aimargues (FR); Marie-Anne Hours, Aimargues (FR); Helene Charles, Aimargues (FR); Matthieu Filippini, Aimargues (FR)

(73) Assignee: MARS, INCORPORATED, McLean, VA (US)

( * ) Notice: Subject to any disclaimer, the term of this patent is extended or adjusted under 35 U.S.C. 154(b) by 537 days.

(21) Appl. No.: 17/284,255

(22) PCT Filed: Oct. 17, 2019

(86) PCT No.: PCT/US2019/056678
§ 371 (c)(1),
(2) Date: Apr. 9, 2021

(87) PCT Pub. No.: WO2020/081774
PCT Pub. Date: Apr. 23, 2020

(65) Prior Publication Data
US 2021/0352935 A1 Nov. 18, 2021

(30) Foreign Application Priority Data

Oct. 18, 2018 (EP) .................................... 18201322

(51) Int. Cl.
*A23K 20/147* (2016.01)
*A23K 20/158* (2016.01)
*A23K 50/42* (2016.01)

(52) U.S. Cl.
CPC .......... *A23K 20/147* (2016.05); *A23K 20/158* (2016.05); *A23K 50/42* (2016.05)

(58) Field of Classification Search
CPC .... A23K 50/40; A23K 20/147; A23K 20/158; A23K 50/42; A23K 10/20; A23K 10/30; A23K 20/163; A23K 20/142; A23V 2200/332; A23V 2002/00; A23J 3/346; A23L 27/10
USPC .......................................... 426/656, 92, 805
See application file for complete search history.

(56) References Cited

U.S. PATENT DOCUMENTS

| 4,738,864 A | 4/1988 | Ernster | |
|---|---|---|---|
| 6,403,142 B1* | 6/2002 | McDaniel, III | A23K 50/40 426/805 |
| 7,067,147 B2 | 6/2006 | Hayek | |
| 8,252,315 B2* | 8/2012 | Dierking | A23K 20/147 426/805 |
| 2003/0035882 A1* | 2/2003 | McDaniel, III | A23K 20/147 426/623 |
| 2003/0059517 A1* | 3/2003 | McDaniel, III | A23K 50/40 426/623 |
| 2003/0072786 A1* | 4/2003 | Hayek | A23K 50/40 424/773 |
| 2006/0067985 A1* | 3/2006 | Dierking | A61P 37/08 424/757 |
| 2006/0257455 A1* | 11/2006 | Chen | A23L 27/201 426/635 |
| 2007/0110880 A1* | 5/2007 | Thomas | A23K 20/163 426/623 |
| 2008/0233244 A1* | 9/2008 | Swenson | A23J 3/26 426/72 |
| 2008/0260894 A1* | 10/2008 | Lim | A23K 50/30 426/2 |
| 2009/0054301 A1* | 2/2009 | Dierking | A23K 40/00 514/1.1 |
| 2011/0034394 A1* | 2/2011 | Kaae | A23L 33/14 426/62 |
| 2011/0104327 A1* | 5/2011 | Kirejevas | A23K 50/42 426/2 |
| 2011/0123669 A1* | 5/2011 | Yamka | A23D 9/013 426/601 |
| 2012/0129785 A1* | 5/2012 | Fleuranges | A61P 19/02 426/108 |
| 2012/0258194 A1* | 10/2012 | Ryan | A23K 40/10 426/2 |

(Continued)

FOREIGN PATENT DOCUMENTS

FR 2 819 382 B1 12/2004
JP 2016-516405 A 6/2016

(Continued)

OTHER PUBLICATIONS

Ward, U.S. Pets Get Fatter, Owners Disagree with Veterinarians on Nutritional Issues, Feb. 21, 2017, Association for Pet Obesity Prevention (APOP) survey 2016, www.petobesityprevention.com, 4 pgs.
Courcier et al., An epidemiological study of environmental factors associated with canine obesity, J. Small Anim. Pract., Jul. 2010, 51(7):362-367.
Flanagan et al., Success of Weight Loss Plan for Overweight Dogs: The Results of an International Weight Loss Study, PLos ONE, Sep. 8, 2017, https://doi.org/10.1371/journal.pone.0184199 (pp. 1-23): table 2; p. 4, bottom paragraph, 12(9): e0184199.
German et al., A high protein high fibre diet improves weight loss in obese dogs, Vet. J., Mar. 2010, 183(3):294-297.

(Continued)

*Primary Examiner* — Drew E Becker
*Assistant Examiner* — Luis Eugenio Diou Berdecia
(74) *Attorney, Agent, or Firm* — Baker Botts L.L.P.

(57) ABSTRACT

The presently disclosed subject matter provides a hypoallergenic palatable composition. The composition includes at least about 25% of at least partially hydrolysed proteins and at least about 10% of crude fibers by weight, based on the total weight of dry matter of the composition. The composition can be used to achieve weight loss and/or weight management of pet animals affected with adverse food reactions (AFR), particularly cutaneous adverse food reactions (CAFR).

10 Claims, No Drawings

(56) References Cited

U.S. PATENT DOCUMENTS

| | | | | |
|---|---|---|---|---|
| 2012/0288608 | A1* | 11/2012 | Zicker | A23K 20/105 |
| | | | | 426/560 |
| 2013/0296165 | A1* | 11/2013 | Harel | A61K 47/36 |
| | | | | 426/62 |
| 2015/0327575 | A1* | 11/2015 | Yu | A23K 20/147 |
| | | | | 514/561 |
| 2016/0073659 | A1* | 3/2016 | Zemel | A23K 20/10 |
| | | | | 426/302 |
| 2016/0330998 | A1* | 11/2016 | Jimenez-Marquez | |
| | | | | A23K 20/174 |
| 2017/0086478 | A1* | 3/2017 | Yamka | A23K 20/30 |
| 2017/0223985 | A1 | 8/2017 | Saito et al. | |
| 2018/0168190 | A1* | 6/2018 | Cox | A61K 31/716 |

FOREIGN PATENT DOCUMENTS

| | | | |
|---|---|---|---|
| RU | 2 403 011 C2 | 11/2010 | |
| RU | 2 419 312 C2 | 5/2011 | |
| RU | 2 520 853 C2 | 6/2014 | |
| RU | 2 635 165 C2 | 11/2017 | |
| WO | WO 01/84950 A1 | 11/2001 | |
| WO | WO-0184950 A1 * | 11/2001 | A23K 20/147 |

OTHER PUBLICATIONS

German, Weight management in obese pets: the tailoring concept and how it can improve results, Acta Vet. Scand. Oct. 2016, 58(Suppl 1):57 (7 pgs.).

Hall et al., Using Gross Energy Improves Metabolizable Energy Predictive Equations for Pet Foods Whereas Undigested Protein and Fiber Content Predict Stool Quality, PLOS ONE, Jan. 2013, .doi:10.1371/journal.pone.0054405 (pp. 1-8): p. 7, right column third paragraph, vol. 8, Issue 1, e54405.

Hefle et al., Allergenic foods, Crit. Rev. Food Sci. Nutr., Nov. 1996, 36 Suppl 1:S69-89.

Olivry et al., International Committee on Allergic Diseases of Animals (ICADA), Validation of the Canine Atopic Dermatitis Extent and Severity Index (CADESI)-4, a simplified severity scale for assessing skin lesions of atopic dermatitis in dogs, Vet. Dermatol., Apr. 2014, 25(2):77-e25.

Olivry et al., Critically appraised topic on adverse food reactions of companion animals (5): discrepancies between ingredients and labeling in commercial pet foods, BMC Vet Res. Jan. 2018, 14(1):24, 5 pgs.

Verlinden et al., Food allergy in dogs and cats: a review, Crit. Rev. Food Sci. Nutr., Dec. 2006, 46, 259-73.

Weber et al., A high-protein, high-fiber diet designed for weight loss improves satiety in dogs, J. Vet. Intern. Med., vol. 21, No. 6, (Nov. 2007), 1203-1208.

* cited by examiner

PET FOOD COMPOSITIONS FOR WEIGHT MANAGEMENT IN PETS WITH ADVERSE FOOD REACTION

CROSS REFERENCE TO RELATED APPLICATION

The present application is a national stage application filed under 35 U.S.C § 371 of International Application No. PCT/US2019/056678 filed on Oct. 17, 2019, which claims the benefit of priority to European Application Serial No. 18201322.7 filed on Oct. 18, 2018, the contents of each which are hereby incorporated by reference herein in their entirety.

1. FIELD OF THE INVENTION

The presently disclosed subject matter relates to pet food compositions for achieving weight loss and/or weight management in pets affected with adverse food reactions (AFR), in particular with cutaneous adverse food reactions (CAFR).

Specifically, the food compositions of the present disclosure can include a high hydrolysed protein content, a low fat content, and a high dietary fiber content, in particular a high crude fiber content.

2. BACKGROUND

Obesity is now recognized as the most prevalent medical disease in pets worldwide, and can significantly decrease their overall longevity. Prevalence of overweightness and obesity in various populations of dogs reportedly range up to 59%. (Courcier et al., 2010; APOP 2016).

Courcier et al. have observed that the environmental risk factors associated with obesity in dogs are multifactorial and include owner's personal income, owner's age, frequency of snacks/treats, and amount of exercise the dog receives.

Drug-based strategies, involving either dirlotapide or mitratapide, have provided encouraging results in weight loss, but were poorly accepted in clinical practice, and hence were withdrawn from the market. (see German, 2016).

Alternative strategies for weight management, including weight loss programs, were developed involving dietary energy restriction and the use of a purpose-formulated diet. A low calorie, high protein, and high fiber diet has been shown to be an efficacious strategy to promote weight loss while preserving lean body mass. (Weber et al., 2007; German et al., 2010).

However, current commercial diets for weight loss contain intact protein sources which can cause allergic flares in allergic pets. In particular, a high protein diet can provoke adverse food reactions (AFR), particularly cutaneous adverse food reactions (CAFR).

CAFR is a non-seasonal pruritic dermatitis caused by ingested allergens, which are essentially proteins and/or glycoproteins of a molecular weight from 10 kDa to 70 kDa. (Hefle et al., 1996). This condition is commonly observed in dogs and reported to account for up to 40% of dogs presented with pruritus. (Olivry and Mueller, 2018). Hydrolysed protein-based diets are one of the recognized strategies for the diagnosis and management of dogs with CAFR. (Verlinden et al., 2006). However, hydrolysed proteins are not known to be very palatable. In addition, Hand et al. (Small animal clinical nutrition; 5$^{th}$ Edition) reported that, for dog pets with CAFR, the excess of dietary proteins should be avoided, i.e., that the dietary proteins should not exceed 16% to 22% by weight, based on the total weight of dry matter of the food product.

Nevertheless, diet compositions generally have moderate protein contents, which is not in favor of maintaining lean body mass during weight loss and providing adequate essential amino acids intake when the daily ration is restricted.

Hence, the current strategies to manage both weight loss and CAFR are conflicting with respect to the protein and fat content, since managing CAFR would involve moderate level of proteins and moderate level of fats, whereas managing weight loss would require high level of proteins and low level of fats.

Consequently, because CAFR and obesity both have a high prevalence in pets, such as in dogs and in cats, there is a need to provide a food composition formulated to manage both conditions, i.e., to achieve weight loss and/or maintenance of lean body mass in pets with concurrent CAFR. In addition, the food composition should be palatable, well tolerated by the pet, and easily produced. The disclosed subject matter addresses these and other needs.

3. SUMMARY OF THE INVENTION

The present disclosure provides food compositions, and more particularly pet food compositions including a low fat, high hydrolysed protein, and high fiber content. The food compositions of the present disclosure can be utilized to achieve weight loss and/or weight management of pet animals affected with adverse food reactions (AFR), particularly cutaneous adverse food reactions (CAFR).

The present disclosure provides a hypoallergenic palatable composition. The composition includes at least about 25% by weight of at least partially hydrolysed proteins and at least about 10% by weight of crude fibers, based on the total weight of dry matter of the composition.

In certain embodiments, the at least partially hydrolysed proteins can include at least about 95% of hydrolysed proteins, based on the total weight of proteins in the composition. In certain embodiments, the at least partially hydrolysed proteins can include totally hydrolysed proteins. In certain embodiments, the at least partially hydrolysed proteins can have a molecular weight ranging from about 1,000 Da to about 11,000 Da.

In certain embodiments, the at least partially hydrolysed proteins can include proteins from a vegetal origin. In certain embodiments, the vegetal origin can include corn, wheat, pea, soy and/or rice origin.

In certain embodiments, the composition can further include, on a dry matter basis, about 15% or less by weight of fat, based on the total weight of dry matter of the composition. In certain embodiments, the composition can further include, on a dry matter basis, about 30% or less by weight of starch, based on the total weight of dry matter of the composition.

In certain embodiments, the composition can further include at least one flavour. In certain embodiments, the at least one flavour can include at least one flavour of protein origin.

In certain embodiments, the Metabolizable Energy (ME) of the composition can be about 3,200 kcal/kg or less. In certain embodiments, the ME of the composition can be measured according to the modified Atwater factorial equation of the National Research Council (NRC) 2006.

The present disclosure further provides a hypoallergenic palatable composition. The composition includes, by weight, based on the total weight of the composition, from about 20% to about 38% of at least partially hydrolysed proteins; from about 8% to about 23% of crude fibers; from about 4% to about 12% of crude fat; and from about 4% to about 12% moisture.

The present disclosure further provides a hypoallergenic palatable composition for use in achieving weight management for a pet animal affected with adverse food reaction characterized in that it comprises:

an amount of at least 25% by weight of at least partially hydrolysed proteins; and an amount of at least 10% by weight of crude fibers, based on the total weight of dry matter of the composition.

In certain embodiments, the composition can be characterized in that the at least partially hydrolysed proteins consist of 95% of hydrolysed proteins, by weight, based on the total weight of proteins in the hypoallergenic palatable composition. In certain embodiments, the composition can be characterized in that the at least partially hydrolysed proteins consist of totally hydrolysed proteins. In certain embodiments, the composition can be characterized in that the at least partially hydrolysed proteins have a molecular weight ranging from about 1,000 Da to about 11,000 Da.

In certain embodiments, the composition can be characterized in that the at least partially hydrolysed proteins are from vegetal origin, in particular from corn, wheat, pea, soy and/or from rice, and more preferentially from soy and/or rice.

In certain embodiments, the composition can be characterized in that it further comprises, on a dry matter basis, an amount of at most 15% by weight of fat, in particular, an amount of at most 10% by weight of fat, based on the total weight of dry matter of the hypoallergenic palatable composition.

In certain embodiments, the composition can be characterized in that it comprises, on a dry matter basis, an amount of at most 30% by weight of starch, in particular, an amount of at most 22% by weight of starch, based on the total weight of dry matter of the hypoallergenic palatable composition.

In certain embodiments, the composition can be characterized in that it further comprises at least one flavour, in particular a natural flavour. In certain embodiments, the composition can be characterized in that the flavour is of protein origin.

In certain embodiments, the composition can be characterized in that the Metabolizable Energy (ME) does not exceed 3,200 kcal/kg, as measured according to the NRC 2006.

In certain embodiments, the pet animal is a cat or a dog.
In certain embodiments, the pet animal is overweight.

The present disclosure further provides a hypoallergenic palatable composition comprising, by weight, based on the total weight of the composition:

an amount ranging from about 20% to about 38% of at least partially hydrolysed proteins;

an amount ranging from about 8% to about 23% of crude fibers;

an amount ranging from about 4% to about 13% of crude fat; and an amount ranging from about 4% to about 12% of moisture.

The present disclosure further provides a method for achieving weight management in a pet animal affected with adverse food reaction characterized in that it comprises at least a step of feeding the pet animal with a hypoallergenic palatable composition as defined in the present disclosure.

The present disclosure further provides methods for achieving weight management in a pet animal affected with adverse food reaction. The method includes feeding the pet animal with a hypoallergenic palatable composition. The composition includes at least about 25% by weight of at least partially hydrolysed proteins and at least about 10% by weight of crude fibers, based on the total weight of dry matter of the composition.

In certain embodiments, the at least partially hydrolysed proteins can include at least about 95% of hydrolysed proteins, based on the total weight of proteins in the composition. In certain embodiments, the at least partially hydrolysed proteins can include totally hydrolysed proteins. In certain embodiments, the at least partially hydrolysed proteins can have a molecular weight ranging from about 1,000 Da to about 11,000 Da.

In certain embodiments, the at least partially hydrolysed proteins can include proteins from vegetal origin. In certain embodiments, the vegetal origin can include corn, wheat, pea, soy and/or rice origin.

In certain embodiments, the composition can further include, on a dry matter basis, about 15% or less by weight of fat, based on the total weight of dry matter of the composition. In certain embodiments, the composition can further include, on a dry matter basis, about 30% or less by weight of starch, based on the total weight of dry matter of the composition.

In certain embodiments, the composition can further include at least one flavour. In certain embodiments, the at least one flavour can include at least one flavour of protein origin.

In certain embodiments, the Metabolizable Energy (ME) of the composition can be about 3,200 kcal/kg or less. In certain embodiments, the ME of the composition can be measured according to the modified Atwater factorial equation of the National Research Council (NRC) 2006.

In certain embodiments, the pet animal can be a cat or a dog.

In certain embodiments, the pet animal can be overweight.

The present disclosure further provides methods for achieving weight management in a pet animal affected with adverse food reaction. The method includes feeding the pet animal with a hypoallergenic palatable composition. The composition includes at least about 25% by weight of at least partially hydrolysed proteins and at least about 10% by weight of crude fibers, based on the total weight of dry matter of the composition. The at least partially hydrolysed proteins include about 95% of hydrolysed proteins, by weight, based on the total weight of proteins in the composition. The at least partially hydrolysed proteins include proteins from vegetal origin.

4. DETAILED DESCRIPTION

The present disclosure provides well-tolerated diet food compositions. The compositions can include a low fat, high hydrolysed protein, and high fiber content. The compositions can be fed at maintenance energy requirements to pet animals, e.g., dogs or cats, with AFR or more particularly with CAFR.

As provided in the Examples below, it was surprisingly and advantageously found that a high protein, high fiber, and low fat diet can ameliorate the skin condition associated with pets having CAFR, while maintaining weight management control. Despite being preferably rich in hydrolysed proteins, which can be known to decrease palatability, the food compositions according to the present disclosure are well accepted by pets.

For clarity and not by way of limitation, this detailed description is divided into the following sub-portions:

4.1. Definitions;
4.2. Hypoallergenic palatable compositions;
4.3. Methods of making hypoallergenic palatable compositions; and
4.4. Methods of using hypoallergenic palatable compositions.

4.1. Definitions

The terms used in this specification generally have their ordinary meanings in the art, within the context of this disclosure and in the specific context where each term is used. Certain terms are discussed below, or elsewhere in the specification, to provide additional guidance in describing the compositions and methods of the disclosure and how to make and use them.

As used in the specification and the appended claims, the singular forms "a," "an" and "the" include plural referents unless the context clearly dictates otherwise. Thus, for example, reference to "a compound" includes mixtures of compounds.

As used herein, the term "about" is intended to refer to an amount or a value plus or minus 10% of the said amount or value.

As used herein, the term "adverse food reaction" is intended to refer to an abnormal or exaggerated clinical response to the ingestion of a food or food additive. It can be immune mediated (i.e., food allergy or hypersensitivity) or not immune mediated (i.e., food intolerance). Illustratively, adverse food reaction in dogs and cats mainly encompasses pruritus, often referred as to itching. In dogs, adverse food reaction can result in additional dermatological signs, such as seborrhoea, pyoderma or *Malassezia*. In cats, the additional dermatological signs can be the presence of eosinophilic plaque, miliary dermatitis or alopecia.

As used herein, the terms "animal" or "pet" can be used, for example, to refer to domestic animals. In certain embodiments, the terms can refer to dogs (canines) or cats (felines).

As used herein, the terms "composition", "food composition" and "pet food composition" can be used interchangeably to refer to the same subject matter.

As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

As used herein, the term "dry matter (DM) basis" is intended to refer to a means for relating to the amount of an ingredient in a composition, in particular a food composition, the said amount being expressed upon the removal of the moisture content of the food composition. At the opposite, the expression "as fed" is intended to refer a to a mean for relating to the amount of an ingredient in the food composition, said amount being expressed in the state it is consumed, which includes moisture. As used herein, dry matter represents the matter upon elimination of the moisture, e.g., by evaporation or by heating. Unless disclosed otherwise, the percentage of ingredients comprised in the dry food composition consists of a percentage by weight based on the total weight of the dry matter of the said food composition.

In the detailed description herein, references to "embodiment," "an embodiment," "one embodiment," "in various embodiments," etc., indicate that the embodiment(s) described can include a particular feature, structure, or characteristic, but every embodiment might not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "hypoallergenic composition" is intended to refer to a composition for which a substantially limited or no allergic reaction is achieved upon consumption of the composition.

As used herein, the term "palatable composition" refers to a composition that is visually appealing (i.e., form and colour) and tasty (i.e., smell and taste) for a pet animal. The palatability of the hypoallergenic palatable compositions according to the present disclosure can be measured by any suitable known method in the art. Illustratively, the palatability can be measured by one or more methods including the first choice (FC) method, the intake ratio (IR) method, the consumption ratio (CR) method, the preference method, or the first approach method. Illustratively, the first choice (FC) method measures which ration from a panel of rations first attracts the pet to eat; the intake ratio (IR) measures the amount of one ration among several rations consumed divided by the total consumption; the consumption ratio (CR) compares the consumption of one ration in terms of the other rations; the preference method provides insight into significant preferences by individual animals in a group of pet taste testers; the first approach method measures which ration the pet first approaches, irrespective of whether the pet consumed any of the ration. Illustratively, a composition according to the present disclosure can achieve a palatability ratio as compared to a reference composition (VET DIET SATIETY SUPPORT DOG DRY; ROYAL CANIN®) of 84:16, as measured in a preference method assay.

As used herein, the term "weight management" is intended to refer to maintaining an average weight or alternatively reducing an average weight, i.e., weight loss.

As used herein, the term "weight percent" or "wt %" or "by weight" is meant to refer to either (i) the quantity by weight of a constituent/component in a composition as a percentage of the total weight of the composition; or (ii) the quantity by weight of a constituent/component in the material as a percentage of the weight of the final material or product.

4.2. Hypoallergenic Palatable Compositions

The present disclosure provides hypoallergenic palatable compositions. In certain embodiments, the compositions can include one or more proteins and one or more dietary fibers, such as crude fibers. In certain embodiments, the compositions can further include fats, ash, nitrogen free extracts (NFE), starches, trace elements, vitamins, antioxidants, flavours, moisture, or combinations thereof.

4.2.1. Proteins

In certain embodiments, the composition can include one or more proteins. The protein content of the composition according to the present disclosure can be relatively high so as to ensure maintenance of lean body mass. In addition, proteins with a high degree of hydrolysis can be used which can reduce the risk of AFR, in particular CAFR.

A composition according to the present disclosure can include one or more distinct source(s) of proteins. Generally, a pet food composition as described herein can include a plurality of sources of proteins.

In certain embodiments, the composition can include at least partially hydrolysed proteins. The at least partially hydrolysed proteins can be from animal origin, in particular, from beef, chicken, turkey, lamb, fish, blood plasma, bone marrow, or combinations thereof. In certain embodiments, the at least partially hydrolysed proteins can be from vegetal origin, in particular, from wheat, soy, rice, corn, pea, or combinations thereof. In certain embodiments, the at least partially hydrolysed proteins can be from vegetal origin, in particular from soy and/or rice.

In certain embodiments, the at least partially hydrolysed proteins can include about 95% of proteins hydrolysed. The term "95% of proteins hydrolysed" as used herein refers to the percentage of hydrolysed proteins by weight, based on the total weight of proteins in the composition. As used herein, the term "95% of hydrolysed proteins" can include about 96%, about 97%, about 98%, about 99% and about 100% of hydrolysed proteins, by weight, based on the total weight of proteins in the composition. In certain embodiments, the at least partially hydrolysed proteins can include at least about 95%, at least about 96%, at least about 97%, at least about 98%, or at least about 99%, or about 100% of hydrolysed proteins, by weight, based on the total weight of proteins in the composition. In certain embodiments, the at least partially hydrolysed proteins can include totally hydrolysed proteins.

In certain embodiments, the at least partially hydrolysed proteins can have a molecular weight ranging from about 1,000 Da to about 11,000 Da. In certain embodiments, the at least partially hydrolysed proteins can have a molecular weight ranging from about 2,000 Da to about 5,000 Da.

As used herein, a molecular weight of the hydrolysed proteins ranging from about 1,000 Da to about 11,000 Da can include about 1,250 Da, about 1,500 Da, about 1,750 Da, about 2,000 Da, about 2,250 Da, about 2,500 Da, about 2,750 Da, about 3,000 Da, about 3,250 Da, about 3,500 Da, about 3,750 Da, about 4,000 Da, about 4,250 Da, about 4,500 Da, about 4,750 Da, about 5,000 Da, about 5,250 Da, about 5,500 Da, about 5,750 Da, about 6,000 Da, about 6,250 Da, about 6,500 Da, about 6,750 Da, about 7,000 Da, about 7,250 Da, about 7,500 Da, about 7,750 Da, about 8,000 Da, about 8,250 Da, about 8,500 Da, about 8,750 Da, about 9,000 Da, about 9,250 Da, about 9,500 Da, about 9,750 Da, about 10,000 Da, about 10,250 Da, about 10,500 Da, or about 10,750 Da.

In certain embodiments, the composition can include from about 20% to about 38%, from about 25% to about 35%, or from about 30% to about 35% by weight of protein, based on the total weight of the composition. In certain embodiments, the protein can be at least partially hydrolysed protein.

As used herein, an amount of from about 20% to about 38% by weight of protein (e.g., at least partially hydrolysed protein) can include about 21%, about 22%, about 23%, about 24%, about 25%, about 26%, about 27%, about 28%, about 29%, about 30%, about 31%, about 32%, about 33%, about 34%, about 35%, about 36%, or about 37% by weight protein, based on the total weight of the composition. In particular embodiments, the composition can include about 30% or about 34% by weight protein (e.g., at least partially hydrolysed protein), based on the total weight of the composition.

Based on the dry matter, the composition according to the present disclosure can also be characterized by its protein content expressed in percentage (%) by weight based on the total weight of dry matter of the composition.

In certain embodiments, the composition can include, on a dry matter basis, from about 25% to about 40%, from about 30% to about 40%, or from about 32% to about 38% by weight of protein, based on a total weight of dry matter of the composition. In certain embodiments, the protein can be at least partially hydrolysed protein. In certain embodiments, the composition can include at least about 25% by weight, at least about 30% by weight, or at least about 35% by weight of protein (e.g., at least partially hydrolysed protein), based on the total weight of dry matter of the composition.

As used herein, an amount of from about 25% to about 40% by weight of protein (e.g., at least partially hydrolysed protein) can include about 26%, about 27%, about 28%, about 29%, about 30%, about 31%, about 32%, about 33%, about 34%, about 35%, about 36%, about 37%, about 38%, or about 39% by weight of protein, based on the total weight of dry matter of the composition. In particular embodiments, the composition can include, on a dry matter basis, about 36.1% or about 32.8% of protein (e.g., at least partially hydrolysed protein), based on the total weight of dry matter of the composition.

4.2.2. Dietary Fibers

In certain embodiments, the composition can include one or more dietary fibers. The total dietary fiber content of the composition according to the present disclosure can be high so as to help reducing the energy density of the diet and promote satiety in pets undergoing a weight loss program, or a weight stabilization program.

As used herein, dietary fiber represents the indigestible part of plant foods. The most common dietary fibers are, without limitation, lignin, cellulose, hemicellulose, pectin, gums, and resistant starches (also referred to as beta-glucans). Illustratively, a source of dietary fiber can include rice hulls, corn and corn by-products, soybean hulls, beet pulp, dried potato product, cellulose, bran, peanut hulls, pectin, or combinations thereof.

As used herein, dietary fibers, also referred as to total dietary fibers, can include soluble fibers (also referred as fermentable fibers) and insoluble fibers (also referred as non-fermentable fibers). Soluble fibers can be defined as being resistant to digestion and absorption in the small intestine and undergo complete or partial fermentation in the large intestine. Insoluble fibers can be defined as non-starch polysaccharides that can be resistant to digestion and absorption in the small intestine, and resistant to fermentation in the large intestine. A suitable source of soluble fibers, for the purpose of the present disclosure, can include beet pulp, guar gum, chicory pulp, chicory root, psyllium, pectin, blueberry, cranberry, squash, apples, oats, beans, citrus, barley, peas, or combinations thereof. A suitable source of insoluble fibers, for the purpose of the present disclosure, can include cellulose, whole wheat products, wheat oat, corn bran, flax seed, grapes, celery, green beans, cauliflower, potato skins, fruit skins, vegetable skins, peanut hulls, soy fiber, or combinations thereof.

Based on the dry matter, the composition according to the present disclosure can also be characterized by its total dietary fiber content expressed in percentage (%) by weight based on the total weight of dry matter of the composition.

In certain embodiments, the composition can include, on a dry matter basis, from about 10% to about 40%, from about 14% to about 26%, from about 18% to about 35%, from about 15% to about 35%, or from about 20% to about 30% by weight of total dietary fibers, based on the total weight of dry matter of the composition.

As used herein, an amount of from about 10% to about 40% by weight of total dietary fibers can include about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, or about 39% by weight of total dietary fibers, based on the total weight of dry matter of the composition.

In certain embodiments, the amount of total dietary fibers does not exceed about 35% by weight, in particular does not exceed about 30% by weight, based on the total weight of dry matter of the composition. In certain embodiments, the composition can include about 35% by weight or less or about 30% by weight or less of total dietary fibers, based on the total weight of dry matter of the composition.

In certain embodiments, the composition can include crude fibers. As used herein, the term "crude fiber" refers to insoluble fibers as generally accepted in the state of the art, and encompasses lignin and cellulose.

In certain embodiments, the composition can include from about 8% to about 23%, from about 10% to about 20%, or from about 14% to about 18% by weight of crude fibers, based on the total weight of the composition.

As used herein, from about 8% to about 23% of crude fibers can include about 9%, about 10%, about 11%, about 12%, about 13%, about 14%, about 15%, about 16%, about 17%, about 18%, about 19%, about 20%, about 21%, or about 22% by weight of crude fibers, based on the total weight of the composition. In particular embodiments, the composition can include about 14.5% or about 17.4% by weight of crude fibers, based on a total weight of the composition.

Based on the dry matter, the composition according to the present disclosure can also be characterized by its crude fiber content expressed in percentage (%) by weight based on the total weight of dry matter of the composition.

In certain embodiments, the composition can include, on a dry matter basis, from about 10% to about 25%, from about 10% to about 20%, or from about 12% to about 20% by weight of crude fibers, based on the total weight of dry matter of the composition. In certain embodiments, the composition can include at least about 10%, at least about 12%, at least about 15%, or at least about 19% by weight of crude fibers, based on the total weight of dry matter of the composition.

As used herein, from about 10% to about 25% by weight of crude fibers can include about 11%, about 12%, about 13%, about 14%, about 15%, about 16%, about 17%, about 18%, about 19%, about 20%, about 21%, about 22%, about 23%, or about 24% by weight of crude fibers, based on the total weight of dry matter of the composition. In particular embodiments, the composition can include, on a dry matter basis, about 15.3% or about 19% by weight of crude fibers, based on the total weight of dry matter of the composition.

4.2.3 Fats

In certain embodiments, the composition can include one or more fats. As used herein, the terms "fat" or "source of fat" are intended to refer to any food-acceptable fat and/or oil. The fat in accordance with the present disclosure can be indifferently in a fluid form and/or in a solid form.

The composition according to the present disclosure can include fat from animal origin and/or from vegetal origin. Fat can be supplied by any suitable source known by those skilled in the art. A suitable plant fat source can include, without limitation, wheat, sunflower, safflower, rapeseed, olive, borage, flaxseed, peanuts, blackcurrant seed, cottonseed, wheat, germ, corn germ, or combinations thereof, as well as oils derived from these and other plant fat sources. A suitable animal fat source can include, for example and without limitation, meat; meat by-products such as chicken fat, turkey fat, beef fat, duck fat, pork fat, lamb fat; fish oil, seafood; dairy; eggs, or combinations thereof. The fat content of food compositions according to the present disclosure can be determined by any method known in the art.

In certain embodiments, the composition can include from about 4% to about 13%, from about 5% to about 13%, from about 8% to about 12%, or from about 9% to about 11% by weight of crude fat, based on the total weight of the composition.

As used herein, an amount of from about 4% to about 13% by weight of crude fat can include about 5%, about 6%, about 7%, about 8%, about 9%, about 10%, about 11%, or about 12% by weight of crude fat, based on the total weight of the composition. In particular embodiments, the composition can include about 9% or about 9.5% by weight of crude fat, based on the total weight of the composition.

Based on the dry matter, the composition according to the present disclosure can also be characterized by its crude fat content expressed in percentage (%) by weight based on the total weight of dry matter of the composition.

In certain embodiments, the composition can include, on a dry matter basis, from about 5% by weight to about 15%, from about 5% to about 12%, or from about 8% to about 12% of crude fat, based on the total weight of dry matter of the composition.

As used herein, an amount of from about 5% to about 15% by weight of crude fat can include about 6.0%, about 6.5%, about 7.0%, about 7.5%, about 8.0%, about 8.5%, about 9.0%, about 9.5%, about 10.0%, about 10.5%, about 11.0%, about 11.5%, about 12.0%, about 12.5%, about 13.0%, about 13.5%, about 14.0%, or about 14.5% by weight of crude fat, based on the total weight of dry matter of the composition. In particular embodiments, the composition can include about 9% or about 10.4% by weight of crude fat, based on the total weight of dry matter of the composition.

In certain embodiments, the composition can include, on a dry matter basis, an amount of at most about 15% by weight of crude fat, in particular, an amount of at most about 10% by weight of crude fat, based on the total weight of dry matter of the composition. In certain embodiments, the composition can include, on a dry matter basis, about 15% or less, about 12% or less, about 10.4% or less, about 10% or less, or about 9% or less by weight of crude fat, based on the total weight of dry matter of the composition.

The crude fat content can include a source of linoleic acid, alpha-linoleic acid, arachidonic acid, omega-6 fatty acids, omega-3 fatty acids, eicosapentaenoic acid (EPA), docosahexaenoic acid (DHA), or combinations thereof. In certain aspects, the EPA/DHA content can improve the metabolic status and generate an anti-inflammatory effect.

In certain embodiments, the composition can include, on a dry matter basis, from about 0.05% to about 0.75%, from about 0.10% to about 0.50%, or from about 0.25% to about 0.5% by weight of EPA/DHA, based on the total weight of dry matter of the composition.

As used herein, an amount of from about 0.05% by weight to about 0.75% by weight of EPA/DHA can include about 0.01%, about 0.15%, about 0.20%, about 0.25%, about 0.30%, about 0.35%, about 0.40%, about 0.45%, about 0.50%, about 0.55%, about 0.60%, about 0.65%, or about 0.70% by weight of EPA/DHA, based on the total weight of dry matter of the composition.

4.2.4. Ash

In certain embodiments, the composition can include ash. Ash can include minerals, such as calcium, phosphorus, sodium, chloride, potassium, magnesium, or combinations thereof.

In certain embodiments, the composition can include from about 3.0% to about 12.0%, from about 5.0% to about 10.0%, or from about 5.0% to about 8.0% by weight of ash, based on the total weight of the composition.

As used herein, an amount of from about 3.0% to about 12.0% by weight of ash can include about 3.5%, about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 10.5%, about 11.0%, or about 11.5% by weight of ash, based on the total weight of the composition. In particular embodiments, the composition can include about 6.2% or about 7.5% by weight of ash, based on the total weight of the composition.

Based on the dry matter, the composition according to the present disclosure can also be characterized by its ash content, expressed in percentage (%) by weight based on the total weight of dry matter of the composition.

In certain embodiments, the ash content in the composition, on a dry matter basis, can range from about 3.5% to about 12.5%, from about 3.0% to about 12.0%, from about 5.0% to about 10.0%, or from about 6.0% to about 8.0% by weight, based on the total weight of dry matter of the composition.

As used herein, an amount of from about 3.5% by weight to about 12.5% by weight of ash can include about 4.0%, about 4.5%, about 5.0%, about 5.5%, about 6.0%, about 6.5%, about 7.0%, about 7.5%, about 8.0%, about 8.5%, about 9.0%, about 9.5%, about 10.0%, about 10.5%, about 11.0%, about 11.5%, or about 12.0% by weight of ash, based on the total weight of dry matter of the composition. In particular embodiments, the composition can include about 6.8% or about 7.9% of ash, based on the total weight of dry matter of the composition.

4.2.5. Nitrogen Free Extract (NFE)

In certain embodiments, the composition can include nitrogen free extract (NFE). As used herein, NFE represents the dry matter that remains after the moisture, proteins, fats, fibers, and ash have been removed from the composition. The NFE can represent the carbohydrate content of the composition.

NFE, or carbohydrates, can be supplied under any suitable source(s), as known in the art. Thus, a person skilled in the art will appreciate that a wide variety of NFE or carbohydrates are suitable for use in compositions of the present disclosure. A suitable source of NFE can be selected from oat fiber, cellulose, peanut hulls, beet pulp, parboiled rice, corn starch, corn gluten meal, or combinations thereof. Grains supplying carbohydrate include, but are not limited to, wheat, corn, barley, or rice.

In certain embodiments, the composition can include about from about 18% to about 38%, from about 20% to about 30%, or from about 25% to about 30% by weight of NFE, based on the total weight of the composition.

As used herein, from about 18% by weight to about 38% by weight of NFE can include about 19%, about 20%, about 21%, about 22%, about 23%, about 24%, about 25%, about 26%, about 27%, about 28%, about 29%, about 30%, about 31%, about 32%, about 33%, about 34%, about 35%, about 36%, or about 37% by weight of NFE, based on the total weight of the composition. In particular embodiments, the composition can include about 28.4% or about 29.5% by weight of NFE, based on the total weight of the composition.

Based on the dry matter, the composition according to the present disclosure can also be characterized by its nitrogen free extract (NFE), expressed in percentage (%) by weight based on the total weight of dry matter of the composition.

In certain embodiments, the NFE content in the composition can range from about 20% to about 40%, from about 25% to about 35%, or from about 28% to about 35% by weight, based on the total weight of dry matter of the composition.

As used herein, from about 20% to about 40% by weight of NFE can include about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, or about 39% by weight NFE, based on the total weight of dry matter of the composition. In particular embodiments, the composition can include about 31% or about 31.2% by weight of NFE, based on the total weight of dry matter of the composition.

4.2.6. Starches

In certain embodiments, the composition can include one or more starches. A person skilled in the art will appreciate a wide variety of starches are suitable for use in compositions of the present disclosure.

The starch can be present in the composition, on a dry matter basis, in an amount of at most of about 30%, at most of about 25%, at most about 22%, or at most about 20% by weight, based on the total weight of dry matter of the composition. In certain embodiments, the composition can include, on a dry matter basis, about 30% or less, about 25% or less, about 22% or less, or about 20% or less by weight of starch, based on the total weight of dry matter of the composition.

4.2.7. Trace Elements

In certain embodiments, the composition can include one or more trace elements. The one or more trace elements can include iron, copper, manganese, zinc, iodine, selenium, or combinations thereof. A person skilled in the art will appreciate a wide variety of trace elements and amounts thereof are suitable for use in compositions of the present disclosure.

4.2.8. Vitamins

In certain embodiments, the composition can include one or more vitamins. The one or more vitamins can include vitamin A, vitamin D, vitamin E, ascorbic acid, vitamin K, thiamine, riboflavin, pantothenic acid, niacin, pyridoxine, folic acid, biotin, vitamin B12, choline, or combinations thereof. A person skilled in the art will appreciate a wide variety of vitamins and amounts thereof are suitable for use in compositions of the present disclosure.

4.2.9. Antioxidants

In certain embodiments, the composition can include one or more sources of antioxidants. As used herein, the term "antioxidant" is intended to refer to a substance that is capable of reacting with free radicals and neutralizing them. Illustrative examples of such substances can include, without limitation, carotenoids, including beta-carotene, lycopene and lutein, selenium, coenzyme Q10 (ubiquinone), tocotrienols, soy isoflavones, S-adenosylmethionine, glutathione, taurine, N-acetylcysteine, vitamin E, vitamin C, lipoic acid or L-carnitine. In particular embodiments, the one or more sources of antioxidants can include arginine.

In certain embodiments, the composition can include, on a dry matter basis, from about 1% to about 4%, from about 1.25% to about 3.75%, or from about 2.00% to about 3.00% by weight of one or more sources of antioxidants, based on the total weight of dry matter of the composition. In particular embodiments, the composition can include, on a dry matter basis, from about 1% to about 4%, from about 1.25% to about 3.75%, or from about 2.00% to about 3.00% by weight of arginine, based on the total weight of dry matter of the composition.

As used herein, from about 1% to about 4% by weight of one or more sources of antioxidants can include about 1.25%, about 1.50%, about 1.75%, about 2.00%, about 2.25%, about 2.50%, about 2.75%, about 3.00%, about 3.25%, about 3.50%, or about 3.75% by weight of the one or more sources of antioxidants, based on the total weight of dry matter of the composition. As used herein, from about 1% to about 4% by weight of arginine can include about 1.25%, about 1.50%, about 1.75%, about 2.00%, about 2.25%, about 2.50%, about 2.75%, about 3.00%, about 3.25%, about 3.50%, or about 3.75% by weight of arginine, based on the total weight of dry matter of the composition.

4.2.10. Flavours

In certain embodiments, the composition can include at least one flavour, for example, a natural flavour. The at least one flavour can be of protein origin. A person skilled in the art will appreciate a wide variety of flavours and amounts thereof are suitable for use in compositions of the present disclosure.

4.2.11. Moisture

In certain embodiments, apart from the dry matter, a composition according to the present disclosure can further include moisture. The moisture content (% w/w) can represent the content of liquid, in particular of aqueous content, more particularly the water content of the composition.

In certain embodiments, the moisture content of the composition can range from about 4% to about 12%, from about 5% to about 10%, from about 5.5% to about 8.5%, or from about 6% to about 10% by weight, based on the total weight of the composition.

As used herein, from about 4% to about 12% by weight of moisture can include about 4.5%, about 5.0%, about 5.5%, about 6.0%, about 6.5%, about 7.0%, about 7.5%, about 8.0%, about 8.5%, about 9.0%, about 9.5%, about 10.0%, about 10.5%, about 11.0%, or about 11.5% by weight of moisture, based on the total weight of the composition. In certain embodiments, from about 4% to about 12% by weight of moisture can include about 5%, about 6%, about 7%, about 8%, about 9%, about 10%, or about 11% by weight of moisture, based on the total weight of the composition. In particular embodiments, the composition can have a moisture content of about 5.5% or about 8.5%, based on the total weight of the composition.

4.2.12. Food Compositions

A first aspect of the present disclosure relates to a hypoallergenic palatable composition for use in achieving weight management for a pet animal affected with adverse food reaction characterized in that it comprises: an amount of at least about 25% by weight of at least partially hydrolysed proteins; and an amount of at least about 10% by weight of crude fibers, based on the total weight of dry matter of the composition.

Another aspect of the present disclosure relates to a hypoallergenic palatable composition for use in a method for achieving weight management for a pet animal affected with adverse food reaction characterized in that it comprises: an amount of at least about 25% by weight of at least partially hydrolysed proteins; and an amount of at least about 10% by weight of crude fibers, based on the total weight of dry matter of the composition.

The present disclosure also relates to the use of a hypoallergenic palatable composition comprising: an amount of at least about 25% by weight of at least partially hydrolysed proteins; and an amount of at least about 10% by weight of crude fibers, based on the total weight of dry matter of the composition, for use in achieving weight management for a pet animal affected with adverse food reaction.

In another aspect, the present disclosure further relates to a hypoallergenic palatable composition comprising, by weight based on the total weight of the said composition: an amount ranging from about 20% by weight to about 38% by weight of at least partially hydrolysed proteins; an amount ranging from about 8% to about 23% of crude fibers; an amount ranging from about 4% to about 13% of crude fat; and an amount ranging from about 4% to about 12% of moisture.

As used herein, the composition according to the present disclosure can alternatively be characterized by (i) the amount of ingredients by weight based on the total weight of dry matter of the said composition, when the moisture is excluded from the ingredients list, or (ii) the amount of ingredients by weight based on the total weight of the composition, when the moisture is incorporated in the ingredients list.

Table 1 below provides an example of a composition according to the present disclosure, on the basis of dry matter, also referred to as % dry matter, or on the basis of the total weight of the composition, also referred to as % as fed.

TABLE 1

Characterization of a composition according to the present disclosure expressed as % dry matter (left column) or % as fed (right column).

|  | % dry matter | % as fed |
| --- | --- | --- |
| Moisture (%) | — | 8.5 |
| Protein (%) | 32.8 | 30.0 |
| Crude Fat (%) | 10.4 | 9.5 |
| Crude Fiber (%) | 19.0 | 17.4 |
| Ash (%) | 6.8 | 6.2 |
| NFE (%) | 31.0 | 28.4 |
| Total | 100% | 100% |

In certain embodiments, the composition can include protein, crude fibers, crude fat, ash, nitrogen free extract (NFE), and moisture. The protein can be present in an amount of from about 20% to about 38% by weight, based on the total weight of the composition. The crude fibers can be present in an amount of from about 8% to about 23% by weight, based on the total weight of the composition. The crude fat can be present in an amount of from about 4% to about 13% by weight, based on the total weight of the composition. The ash can be present in an amount of from about 3.0% to about 12.0% by weight, based on the total weight of the composition. The NFE can be present in an amount of from about 18% to about 38% by weight, based on the total weight of the composition. The moisture can be present in an amount of from about 4% to about 12% by weight, based on the total weight of the composition.

In certain embodiments, the composition can include protein, fat, and crude fibers. The protein can be present in an amount of from about 20% to about 38% by weight, based on the total weight of the composition. The crude fibers can be present in an amount of from about 8% to about 23% by weight, based on the total weight of the composition. The fat can be present in an amount of from about 4% to about 13% by weight, based on the total weight of the composition.

As provided above, based on the dry matter, the composition according to the present disclosure can also be characterized by these components expressed in percentage (%) by weight based on the total weight of dry matter of the composition.

In certain embodiments, can include protein, crude fibers, crude fat, ash, and nitrogen free extract (NFE). The protein can be present in an amount of from about 25% to about 40% by weight, based on the total weight of dry matter of the composition. The crude fibers can be present in an amount of from about 10% to about 25% by weight, based on the total weight of dry matter of the composition. The crude fat can be present in an amount of about 15% or less by weight, based on a total weight of dry matter of the composition. The ash can be present in an amount of from about 3.5% to about 12.5% by weight, based on the total weight of dry matter of the composition. The NFE can be present in an amount of from about 20% to about 40% by weight, based on the total weight of dry matter of the composition.

4.2.13. Features of Food Compositions

In certain embodiments, the food composition according to the present disclosure can also be characterized by its Metabolizable Energy (ME) parameter. As used herein, the ME parameter represents the energy value of a food composition that is directly metabolized after consumption.

Within the scope of the present disclosure, the ME value can be measured by any suitable method known in the art. Illustratively, the ME value can be measured using feeding trial. In practice, the gross energy (GE) of the food is determined in the laboratory, and the amounts of food eaten by the animals are recorded. The faeces and urine from the animals are collected, and the energy in each is determined and called faecal energy (FE) and urinary energy (UE), respectively. The ME is then calculated as:

$$ME(kcal/kg) = [GE-(FE+UE)]/Kg \text{ of food consumed.}$$

Alternatively, the ME value can be measured by a mathematical method, in particular taking into account the percentage of crude fat (CF), of crude protein (CP), and NFE (carbohydrates) in the composition. In practice each percentage is multiplied by its respective Atwater Factors. The resulting sum is then multiplied by 10. The mathematical method can be represented by the following formula:

$$ME(kcal/kg) = 10 \times [(3.5 \times CP) + (8.5 \times CF) + (3.5 \times NFE)].$$

To date, the most commonly used equation is the modified Atwater factorial equation proposed by the National Research Council (NRC) in 1974, in 1985 and in 2006.

In some embodiments, the Metabolizable Energy (ME) does not exceed 3,200 kcal/kg, as measured according to the NRC 2006. In certain embodiments, the ME can be about 3,200 kcal/kg or less, about 3,100 kcal/kg or less, about 3,000 kcal/kg or less, about 2,800 kcal/kg or less, or about 2,600 kcal/kg or less. In certain embodiments, the composition can have a ME of from about 1,000 kcal/kg to about 3,1000 kcal/kg, from about 2,000 kcal/kg to about 3,200 kcal/kg, or from about 2,500 kcal/kg to about 3,150 kcal/kg. In particular embodiments, the composition can have a ME of about 2,556 kcal/kg, about 2,709 kcal/kg, about 3,108 kcal/kg, or about 3,115 kcal/kg.

The hypoallergenic palatable compositions according to the present disclosure can be in any suitable form, as disclosed in the state of the art. In some embodiments, the hypoallergenic palatable composition is in the form of a kibble, a snack, a treat or a biscuit.

4.3. Methods of Making Hypoallergenic Palatable Compositions

The hypoallergenic palatable compositions according to the present disclosure can be manufactured following the common principles and methods from the state of the art, although adaptations of these principles and methods can be performed when required.

In practice, a food composition can be prepared by mixing together ingredients and kneading in order to make a consistent dough, which can be subsequently cooked. The process of manufacturing a pet food composition is usually done by baking and/or extruding. The dough is typically fed into an expander and/or extruder, which use pressurized steam or hot water to cook the ingredients. While inside the extruder, the dough is under extreme pressure and high temperatures. The dough is then pushed through a die (specifically sized and shaped hole) and then cut off using a knife. The puffed dough pieces are made into kibble by passing it through a dryer so that moisture is dropped down to a defined target ensuring stability of the food until consumption. The kibble can then be sprayed with fats, oils, minerals, vitamins, the natural extracts cocktail and optionally sealed into packages.

It is needless to mention that the combined ingredients of the compositions according to the present disclosure can provide all the recommended nutrients, vitamins and minerals for the pet, i.e., a complete and balanced food.

In certain embodiments, the food composition according to the present disclosure can comply with the recommendations provided by the National Research Council, in 2006 (Nutritional Requirements for dogs, National Academy Press, Washington DC) or by the Association of America Feed Control Officials (Official Publication 1996).

4.4. Methods of Using Hypoallergenic Palatable Compositions

The present disclosure provides for methods of using hypoallergenic palatable compositions of the present disclosure. As mentioned above, such compositions can be used for weight management including weight loss. Weight issues in a pet animal can be evaluated by any suitable method known in the art.

Illustratively, the 9-point scale of the body condition score (BCS) can be used. A BCS of from 6 to 9 would be indicative of an overweight pet animal, in particular, a score of 8 or 9 would be indicative of an obese pet animal. A BCS of 6 is indicative of a pet animal which weight is up to about 15% over its reference ideal weight; a BCS of 7 is indicative of a pet animal which weight is from about 15% to about 30% over its reference ideal weight; a BCS of 8 is indicative of a pet animal which weight is from about 30% to about 45% over its reference ideal weight; a BCS of 9 is indicative of a pet animal which weight is above about 45% over its reference ideal weight. Within the scope of the present disclosure, a reference ideal weight for a pet animal can be obtained by measuring the BCS. A BCS of 4 or 5 is indicative of a pet animal having an ideal weight. In some embodiments, the pet animal is overweight. In practice, the pet animal has a BCS of at least 6, on a 1 to 9 scale. As used herein, a BCS of at least 6 can include a BCS of 6, 7, 8 or 9.

Another aspect of the present disclosure further relates to methods for achieving weight management in a pet animal affected with adverse food reaction characterized in that it comprises at least a step of feeding the pet animal with a hypoallergenic palatable composition as defined in the present disclosure.

In certain embodiments, the step of feeding the pet animal with a hypoallergenic palatable composition can be performed once, twice or three times per day; every other day; or once, twice, three times, four times, or five times per week.

In certain embodiments, the step of feeding the pet animal with a hypoallergenic palatable composition can be performed for a period of one, two, three, four, five, six, seven, eight, or ten weeks, or more; or one, two, three, four, five, six, seven, eight, or ten months, or more.

The dosage regimen of the hypoallergenic palatable composition as defined in the present disclosure can depend from the age, the sex, the breed, the general condition of the pet animal. In certain embodiments, the pet animal can be a cat or a dog.

5. EXAMPLES

The presently disclosed subject matter will be better understood by reference to the following Examples, which are provided as exemplary of the disclosure, and not by way of limitation.

Example 1

The present example provides palatable hypoallergenic compositions according to the present disclosure and testing of several parameters (i.e., body weight; Body Condition Score (BCS); Canine Atopic Dermatitis Extent and Severity Index (CADESI-4); begging score; and quality of life))) of dogs fed such compositions over time.

1. Materials and Methods

The protocol was approved by the Royal Canin® Ethical Committee. The study was carried out in four (4) French veterinary clinics. Client-owned adult dogs with a Body Condition Score (BCS)≥5 (on a 9-point scale) with confirmed or a strong suspicion of cutaneous adverse food reactions (CAFR) based upon history and clinical features were included. Dogs were previously fed with a dedicated food to manage food allergies (hydrolysed protein-based diets with moderate protein contents) for longer than one month and had a stabilized skin condition with a CADESI-04 (Canine Atopic Dermatitis Extent and Severity Index, as described in (Olivry et al., 2014))≤10, and a pruritus score (5-point scale, from 0=normal to 5=extreme)≤1. All dogs were correctly treated against external and internal parasites prior to the inclusion and for the duration of the study.

For 15 days, after a 3-day dietary transition, dogs were exclusively fed the test diet (Hydrolysed soy protein-based; Crude protein 30%; Crude fat 9.5%; Total dietary fibers 28.1%; Metabolizable Energy (ME) 2556 kcal/kg as fed, calculated with NRC 2006 predictive equation)) at maintenance energy requirements (80-95 kcal/kg$^{0.75}$).

Body weight (BW), CADESI-04, and pruritus score were recorded at baseline (V0) and after 15 days (V15). Palatability and digestive tolerance of the diets were also evaluated by the owners at V0 and V15. Statistical analysis was performed using a Statistical Software (SAS Institute). CADESI-04 and pruritus scores at V15 were compared with initial score (V0) using Wilcoxon signed-rank test. The level of statistical significance was set at p<0.05. Results are expressed as mean±SD.

2. Results

Sixteen adult dogs (11 males and 5 females; Age: 6.5±2.4 years old) were enrolled and completed the trial.

The trial population characteristics are presented in Table 2 below.

TABLE 2

Population Characteristics

| | Hypo Satiety |
|---|---|
| Number of dogs | 16 |
| Sex ratio | 11 males/5 females |
| Mean weight (kg) | 22.6 |
| [Min-Max] | [3.1-75] |
| BCS | 6 |
| Median | [5-7] |
| [Min-Max] | |
| Age | 6 |
| Median/Average (years) | [1-10] |
| [Min-Max] | |
| Current diet | 11 hypoallergenic |
| | 2 hypoallergenic moderate calorie |
| | 3 hypoallergenic small dog |

Before enrolment, all dogs were fed hydrolysed soy protein-based commercial diets, with moderate protein contents, designed for the management of CAFR.

The evolution of the monitored parameters is indicated in Table 3 below.

TABLE 3

Parameters Evolution

| | V0 | V15 | p value |
|---|---|---|---|
| Weight (kg) | 22.6 ± 20.5 | 23.1 ± 20.2 | 0.4 |
| BCS | 6 ± 0.7 | 6 ± 0.7 | 0.58 |
| Prurit score (average) | 0.5 ± 0.5 | 0.25 ± 0.9 | 0.13 |
| [Min-Max] | [0-1] | [0-1] | |
| CADESI-04 (average) | 2.25 ± 1.7 | 1.56 ± 0.9 | 0.08 |
| [Min-Max] | [1-6] | [0-3] | |
| Begging score | 0.37 | 0.56 | 0.15 |
| [Min-Max] | [0-1] | [0-1] | |
| Quality of life | 9.187 | 9.625 | 0.02 |

Body weight and BCS were maintained over the duration of the study. No treatment had to be administered over the duration of the trial, and no skin flare was recorded. CADESI-04 and pruritus scores did not differ significantly between baseline and two weeks after feeding the test diet. Acceptance of the new diet was satisfactory, with 15/16 owners (94%) rating palatability as good. 14/15 (94%) owners scored the consistency of the stools as normal with the new diets (versus 14/16 at baseline).

Altogether, these data highlighted that this novel diet with high levels of hydrolysed soy protein and high levels of dietary fiber was well tolerated in dogs with CAFR. Dogs switching to the test diet remained stable, skin condition was maintained, with no pruritus flare observed. Palatability and digestive tolerance were high, which are essential for optimal pet-owner compliance in the multimodal management of both overweight and CAFR.

Example 2

The present example provides palatable hypoallergenic compositions according to the present disclosure. Palatable hypoallergenic compositions according to the present disclosure are shown in Tables 4 and 5 below.

TABLE 4

Dog Food Compositions

| | Canine food composition[3] | |
|---|---|---|
| | (% as fed) | % dry matter |
| Moisture (%) | 8.5 | — |
| Protein (%) | 30.0 | 32.8 |
| Crude Fat (%) | 9.5 | 10.4 |
| Crude Fiber (%) | 17.4 | 19.0 |
| Ash (%) | 6.2 | 6.8 |
| NFE[1] (%) | 28.4 | 31.0 |
| ME (NRC 2006) (kcal/kg)[2] | 2,556 | |

[1]NFE stands for "nitrogen free extract".
[2]ME (NRC 2006) represents the ME determined by the modified Atwater factorial equation as proposed by the National Research Council (NRC) in 2006.
[3]Composition: hydrolysed soy protein, brewers rice, powdered cellulose, natural flavours (including poultry and cow milk), chicken fat, pea fiber, dried plain beet pulp, fish oil, calcium carbonate, potassium chloride, monocalcium phosphate, vegetable oil, psyllium seed husk, fructooligosaccharides, sodium tripolyphosphate, choline chloride, DL-methionine, vitamins [DL-alpha tocopherol acetate (source of vitamin E), niacin supplement, L-ascorbyl-2-polyphosphate (source of vitamin C), D-calcium pantothenate, biotin, pyridoxine hydrochloride (vitamin B6), riboflavin supplement, thiamine mononitrate (vitamin B1), vitamin A acetate, vitamin B12 supplement, folic acid], taurine, marigold extract (Tagetes erecta L.), magnesium oxide, N-butyric acid, trace minerals [zinc proteinate, zinc oxide, manganese proteinate, manganous oxide, copper sulfate, ferrous sulfate, sodium selenite, copper proteinate, calcium iodate], GLA safflower oil, L-carnitine, rosemary extract, preserved with mixed tocopherols and citric acid.

TABLE 5

Cat Food Compositions

| | Feline food composition[3] | |
|---|---|---|
| | (% as fed) | % dry matter |
| Moisture (%) | 5.5 | — |
| Protein (%) | 34.0 | 36.1 |
| Crude Fat (%) | 9.0 | 9.5 |
| Crude Fiber (%) | 14.5 | 15.3 |

TABLE 5-continued

Cat Food Compositions

| | Feline food composition[3] | |
|---|---|---|
| | (% as fed) | % dry matter |
| Ash (%) | 7.5 | 7.9 |
| NFE[1] (%) | 29.5 | 31.2 |
| ME (NRC 2006)[2] (kcal/kg) | 3,155 | |

[1]NFE stands for "nitrogen free extract".
[2]ME (NRC 2006) represents the ME determined by the modified Atwater factorial equation as proposed by the National Research Council (NRC) in 2006.
[3]Composition: hydrolysed soy protein, brewers rice, powdered cellulose, chicken fat, natural flavours (including poultry), dried chicory root, calcium sulfate, potassium chloride, psyllium seed husk, fish oil, calcium carbonate, sodium pyrophosphate, monocalcium phosphate, choline chloride, taurine, vitamins [DL-alpha tocopherol acetate (source of vitamin E), niacin supplement, L-ascorbyl-2-polyphosphate (source of vitamin C), D-calcium pantothenate, biotin, pyridoxine hydrochloride (vitamin B6), riboflavin supplement, thiamine mononitrate (vitamin B1), vitamin A acetate, vitamin B12 supplement, folic acid], DL-methionine, salt, marigold extract (Tagetes erecta L.), trace minerals [zinc proteinate, zinc oxide, manganese proteinate, manganous oxide, copper sulfate, ferrous sulfate, sodium selenite, copper proteinate, calcium iodate], magnesium oxide, L-carnitine, rosemary extract, preserved with mixed tocopherols and citric acid.

Example 3

The present example provides palatable hypoallergenic compositions according to the present disclosure (i.e., "composition" below) in comparison to commercially available products. Comparison of the hypoallergenic compositions on the market (Hill's Z/D® and Purina HA®) and a composition according to the present disclosure.

TABLE 6

Canine Compositions

| | Hill's z/d ® | Purina HA ® | Composition |
|---|---|---|---|
| Proteins | 19.2% (53 g/Mcal) | 19.8% (53 g/Mcal) | 30% (111 g/Mcal) |
| Fat | 14.7% (41 g/Mcal) | 9.8% (26 g/Mcal) | 9.5% (35 g/Mcal) |
| Crude fibers | 4.6% (13 g/Mcal) | 1.5% (4 g/Mcal) | 17.4% (64 g/Mcal) |
| ME (NRC 2006)[1] | 3,620 kcal/kg | 3,723 kcal/kg | 2,709 kcal/kg |

[1]ME: metabolizable energy content, as determined by the modified Atwater factorial equation as proposed by the National Research Council (NRC) in 2006.

TABLE 7

Feline Compositions

| | Hill's z/d ® | Purina HA ® | Composition |
|---|---|---|---|
| Proteins | 32.4% (88 g/Mcal) | 31.2% (77 g/Mcal) | 34% (109 g/Mcal) |
| Fat | 14.9% (40 g/Mcal) | 11.2% (28 g/Mcal) | 9.0% (29 g/Mcal) |
| Crude fibers | 3.1% (8 g/Mcal) | 1.8% (4 g/Mcal) | 14.5% (47 g/Mcal) |
| ME (NRC 2006)[1] | 3,680 kcal/kg | 4,032 kcal/kg | 3,108 kcal/kg |

[1]ME: metabolizable energy content, as determined by the modified Atwater factorial equation as proposed by the National Research Council (NRC) in 2006.

Although the presently disclosed subject matter and its advantages have been described in detail, it should be understood that various changes, substitutions and alterations can be made herein without departing from the spirit and scope of the application as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein can be utilized according to the presently disclosed subject matter. Accordingly, the appended claims are intended to include within their scope such processes, machines, manufacture, compositions of matter, means, methods, or steps.

For any patents, patent applications, publications, product descriptions, and protocols are cited throughout this application, the disclosures of all of which are incorporated herein by reference in their entireties for all purposes.

REFERENCES

Association for Pet Obesity Prevention (APOP) survey 2016. www.petobesityprevention.com Courcier E A, Thomson R M, Mellor D J, Yam P S. An epidemiological study of environmental factors associated with canine obesity. J Small Anim Pract. 2010 July; 51(7):362-7.

German A J, Holden S L, Bissot T, Morris P J, Biourge V. A high protein high fibre diet improves weight loss in obese dogs. Vet J. 2010 March; 183(3):294-7.

German A J. Weight management in obese pets: the tailoring concept and how it can improve results. Acta Vet Scand. 2016, 58(Suppl 1):57.

Hand M S, Thatcher C D, Remillard R L, Roudebush P, Novotny B J. Small animal clinical nutrition, 5th Edition, 2010.

Hefle S L, Nordlee J A, Taylor S L. Allergenic foods. Crit Rev Food Sci Nutr. 1996; 36 Suppl: S69-89.

Olivry T, Saridomichelakis M, Nuttall T, Bensignor E, Griffin C E, Hill P B; International Committee on Allergic Diseases of Animals (ICADA). Validation of the Canine Atopic Dermatitis Extent and Severity Index (CADESI)-4, a simplified severity scale for assessing skin lesions of atopic dermatitis in dogs. Vet Dermatol. 2014 April; 25(2):77-85.

Olivry T, Mueller R S. Critically appraised topic on adverse food reactions of companion animals (5): discrepancies between ingredients and labeling in commercial pet foods. BMC Vet Res. 2018 Jan. 22; 14(1):24.

Verlinden A, Hesta M, Millet S, Janssens G P. Food allergy in dogs and cats: a review. Crit Rev Food Sci Nutr. 2006; 46(3):259-73.

Weber M, Bissot T, Servet E, Sergheraert R, Biourge V, German A J. A high-protein, high-fiber diet designed for weight loss improves satiety in dogs. J Vet Intern Med. 2007 November-December; 21(6):1203-8.

The invention claimed is:

1. A hypoallergenic palatable composition, comprising:
    at least about 25% by weight of at least partially hydrolysed proteins; and
    at least about 10% by weight of crude fibers,
    based on the total weight of dry matter of the composition, and
    from about 4% to about 12% moisture,
    wherein the at least partially hydrolysed proteins have a molecular weight ranging from about 1,000 Da to about 11,000 Da.

2. The composition of claim 1, wherein the at least partially hydrolysed proteins comprise at least about 95% of hydrolysed proteins, based on the total weight of proteins in the composition.

3. The composition of claim 1, wherein the at least partially hydrolysed proteins comprise 100% of hydrolysed proteins.

4. The composition of claim 1, wherein the at least partially hydrolysed proteins comprise proteins from a vegetal origin.

5. The composition of claim 4, wherein the vegetal origin comprises corn, wheat, pea, soy and/or rice origin.

6. The composition of claim 1, further comprising, on a dry matter basis, about 15% or less by weight of fat, based on the total weight of dry matter of the composition.

7. The composition of claim 1, wherein the composition further comprises, on a dry matter basis, about 30% or less by weight of starch, based on the total weight of dry matter of the composition.

8. The composition of claim 1, wherein the Metabolizable Energy (ME) of the composition is about 3,200 kcal/kg or less, as measured according to the modified Atwater factorial equation of the National Research Council 2006.

9. A hypoallergenic palatable composition comprising, by weight, based on the total weight of the composition,
    from about 20% to about 38% of at least partially hydrolysed proteins;
    from about 17.4% to about 23% of crude fibers;
    from about 4% to about 13% of crude fat; and
    from about 4% to about 12% moisture,
    wherein the at least partially hydrolysed proteins have a molecular weight ranging from about 1,000 Da to about 11,000 Da.

10. The composition according to claim 9, characterized in that the at least partially hydrolysed proteins consist of 100% of hydrolysed proteins.

* * * * *